United States Patent
Faust et al.

(10) Patent No.: US 9,631,038 B2
(45) Date of Patent: *Apr. 25, 2017

(54) POLYMERIZATION INITIATING SYSTEM AND METHOD TO PRODUCE HIGHLY REACTIVE OLEFIN FUNCTIONAL POLYMERS

(71) Applicants: University of Massachusetts, Boston, MA (US); Infineum International Limited, Abingdon (GB)

(72) Inventors: Rudolf Faust, Lexington, MA (US); Rajeev Kumar, Lowell, MA (US); Jacob Emert, Brooklyn, NY (US)

(73) Assignees: University of Massachusetts, Boston, MA (US); Infineum International Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,490

(22) Filed: Oct. 11, 2013

(65) Prior Publication Data

US 2015/0105525 A1    Apr. 16, 2015

(51) Int. Cl.
| | |
|---|---|
| *C08F 4/52* | (2006.01) |
| *C08F 4/70* | (2006.01) |
| *C08F 4/80* | (2006.01) |
| *C08F 110/10* | (2006.01) |

(52) U.S. Cl.
CPC .............. *C08F 110/10* (2013.01); *C08F 4/52* (2013.01); *C08F 4/70* (2013.01); *C08F 4/80* (2013.01)

(58) Field of Classification Search
CPC .... C08F 10/10; C08F 4/52; C08F 4/70; C08F 4/80
USPC .............................. 526/142, 140, 144, 348.7
See application file for complete search history.

(56) References Cited

U.S. PATENT DOCUMENTS

| | | | |
|---|---|---|---|
| 2,682,531 A | 6/1954 | Ernst et al. | |
| 3,846,392 A | 11/1974 | Matsumura et al. | |
| 3,850,897 A | 11/1974 | Priola et al. | |
| 5,254,649 A | 10/1993 | Miln et al. | |
| 5,408,018 A | 4/1995 | Rath | |
| 5,663,470 A | 9/1997 | Chen et al. | |
| 5,710,225 A | 1/1998 | Johnson et al. | |
| 5,789,335 A | 8/1998 | Chen et al. | |
| 6,211,312 B1 | 4/2001 | Holtcamp | |
| 6,346,585 B1 | 2/2002 | Johnson et al. | |
| 6,407,170 B1 | 6/2002 | Johnson et al. | |
| 6,407,186 B1 | 6/2002 | Rath et al. | |
| 6,441,110 B1 | 8/2002 | Sigwart et al. | |
| 6,562,913 B1 | 5/2003 | Baxter, Jr. et al. | |
| 6,683,138 B2 | 1/2004 | Baxter, Jr. et al. | |
| 6,753,389 B1 | 6/2004 | Rath et al. | |
| 6,846,903 B2 | 1/2005 | Wettling et al. | |
| 6,939,943 B2 | 9/2005 | Wettling et al. | |
| 7,038,008 B2 | 5/2006 | Wettling et al. | |
| 7,217,773 B2 | 5/2007 | Rath et al. | |
| 7,291,758 B2 | 11/2007 | Bohnenpoll et al. | |
| 7,683,194 B2 | 3/2010 | Krossing et al. | |
| 8,349,977 B2 * | 1/2013 | Koenig .................... | C08F 10/10 526/210 |
| 8,637,619 B2 * | 1/2014 | Koenig .................... | C08F 10/10 526/210 |
| 8,697,820 B2 * | 4/2014 | Koenig ................. | C08F 110/10 526/146 |
| 9,034,990 B2 | 5/2015 | Li et al. | |
| 9,034,998 B2 * | 5/2015 | Faust ..................... | C08F 110/10 526/210 |
| 9,156,924 B2 * | 10/2015 | Faust ........................ | C08F 4/26 |
| 2004/0059076 A1 | 3/2004 | Webb et al. | |
| 2008/0293900 A1 | 11/2008 | Hanefeld et al. | |
| 2009/0318624 A1 | 12/2009 | Storey et al. | |
| 2011/0201772 A1 | 8/2011 | Konig et al. | |
| 2012/0165473 A1 | 6/2012 | Koenig et al. | |
| 2013/0158217 A1 * | 6/2013 | Faust et al. ..................... | 526/192 |
| 2014/0275453 A1 * | 9/2014 | Faust ........................ | C08F 4/26 526/135 |
| 2016/0333123 A1 | 11/2016 | Faust et al. | |

FOREIGN PATENT DOCUMENTS

| | | | |
|---|---|---|---|
| CN | 1753918 A | 3/2006 | |
| CN | 101613423 A * | 12/2009 | ................ C08F 4/14 |
| CN | 101613423 B | 12/2009 | |
| CN | 101955558 A | 1/2011 | |
| CN | 101955558 B * | 1/2011 | .............. C08F 10/10 |
| CN | 102007149 A | 4/2011 | |
| CN | 102046671 A | 5/2011 | |
| CN | 102137875 A | 7/2011 | |
| EP | 0 436 775 A2 | 7/1991 | |
| EP | 0 489 508 A2 | 6/1992 | |
| EP | 2 604 635 A1 | 6/2013 | |
| JP | 3-203917 B2 | 6/1995 | |
| JP | 48-60784 | 1/2012 | |

(Continued)

OTHER PUBLICATIONS

Wu et al. (CN 101955558 B) Jan. 26, 2011; machine translation.*
Kumar, R.; Dimitrov, P.; Bartelson, K.J.; Emert, J.; Faust, R. Macromolecules 2012, 45, 8598-8603.*
Liu, Q.; Wu, Y.; Yan, P.; Zhang, Y.; Xu, R. Macromolecules 2011, 44, 1866-1875.*
International Preliminary Report on Patentability mailed on Jun. 26, 2014 for PCT/US2012/069822 for application entitled: "Polymerization Initiating System and Method to Produce Highly Reactive Olefin Functional Polymers,".
Office Action for U.S. Appl. No. 13/328,569, dated Jul. 9, 2014.

(Continued)

*Primary Examiner* — Rip A Lee
(74) *Attorney, Agent, or Firm* — Hamilton, Brook, Smith & Reynolds, P.C.

(57) ABSTRACT

A method for producing highly reactive olefin polymers wherein at least 50 mol. % of the polymer chains have terminal double bonds, and a novel polymerization initiating system for accomplishing same.

34 Claims, No Drawings

(56) References Cited

FOREIGN PATENT DOCUMENTS

| WO | WO 94/19380 A1 | 9/1994 |
|---|---|---|
| WO | WO 99/07753 A1 | 2/1999 |
| WO | WO 02/48216 A2 | 6/2002 |
| WO | WO 2004/014968 A2 | 2/2004 |
| WO | WO 2004/058828 A1 | 7/2004 |
| WO | WO 2006/074211 A1 | 7/2006 |
| WO | WO 2008/095933 A1 | 8/2008 |
| WO | WO 2009/120551 A1 | 10/2009 |
| WO | WO 2010/008890 A2 | 1/2010 |
| WO | WO 2010/139684 A1 | 12/2010 |
| WO | WO 2011/054785 A1 | 5/2011 |
| WO | WO 2013/021058 A1 | 2/2013 |
| WO | WO 2013/090764 A1 | 6/2013 |

OTHER PUBLICATIONS

Extended European Search Report for European Appl. No. 14157689.2, entitled: Polymerization Initiating System and Method to Produce Highly Reactive Olefin Functional Polymers; Dated: May 22, 2014.

Shiman, D. I. et al., "Cationic Polymerization of Isobutylene by AICl$_3$/ether Complexes in Non-Polar Solvents: Effect of Ether Structure on the Selectivity of β-H Elimination," *Polymer*, 54(9): 2235-2242 (Apr. 1, 2013).

Final Office Action, U.S. Appl. No. 13/328,569, Date of Mailing: Jan. 3, 2014.

Non-Final Office Action for U.S. Appl. No. 13/328,569, Date Mailed: Jan. 18, 2013.

Non-Final Office Action for U.S. Appl. No. 13/328,569, Date of Mailing, Mar. 20, 2013.

Non-Final Office Action for U.S. Appl. No. 13/796,405, Date of Mailing, Jan. 30, 2014.

European Search Report for EP Application No. 11194680.2-1301, entitled "Polymerization Initiating System and Method to Produce Highly Reactive Olefin Functional Polymers,", Date of Mailing, Mar. 22, 2013.

International Search Report and Written Opinion for Int'l Application No. PCT/US2012/069822, entitled, "Polymerization Initiating System and Method to Produce Highly Reactive Olefin Functional Polymers,", Date of Mailing, Mar. 22, 2013.

Kennedy et al., "New Telechelic Polymers and Sequential Copolymers by Polyfunctional Initiator-Transfer Agents (Inifers)," *Polymer Bulletin* (1), pp. 575-580, 1979.

Liu et al., "A cost-effective process for highly reactive polyisobutylenes via cationic polymerization coinitiated by AlCl$_3$," *Polymer* (51), pp. 5960-5969, 2010.

Morgan et al., "Sulfonium Ion Adducts from Quasiliving Polyisobutylene and Mono- or Disulfides," *Macromolecules* (42), pp. 2344-2352, 2009.

Nielsen et al., "Synthesis of Isobutenyl-telechelic polyisobutylene by functionalization with isobutenyltrimethylsilane," *Polymer* (38)(No. 10), pp. 2529-2534, 1997.

Simison et al., "End-Quenching of Quasiliving Carbocationic Isobutylene Polymerization with Hindered Bases: Quantitative Formation of *exo*-Olefin-Terminated Polyisobutylene," *Macromolecules* (39), pp. 2481-2487, 2006.

Vasilenko et al., "Cationic Polymerization of Isobutylene Using AlCl$_3$Bu$_2$ as a Coinitiator: Synthesis of Highly Reactive Polyisobutylene," *Macromolecules* (43), pp. 5503-5507, 2010.

Final Office Action for U.S. Appl. No. 13/796,405, date mailed: Aug. 21, 2014.

Extended European Search Report for European Appl. No. 14187668.0 entitled "Polymerization Initiating System and Method to Produce Highly Reactive Olefin Functional Polymers," dated Feb. 15, 2015.

Notice of Allowance for U.S. Appl. No. 13/328,569; Date Mailed: Jan. 30, 2015.

Notice of Allowance for U.S. Appl. No. 13/796,405; Date Mailed: Jul. 7, 2015.

Chinese Office Action and Search Report for Patent Application 201280069469.X dated Oct. 10, 2015, "Polymerization Initiating System and Method to Produce Highly Reactive Olefin Functional Polymers,".

Chinese Office Action and Search Report for Patent Application 2014100878340 dated Dec. 3, 2015, "Polymerization Initiating System and Method to Produce Highly Reactive Olefin Functional Polymers,".

Japanese Office Action for Patent Application 20144547502 dated Feb. 19, 2016, "Polymerization Initiating System and Method to Produce Highly Reactive Olefin Functional Polymers,".

Non-Final Office Action for U.S. Appl. No. 14/710,763; Date Mailed: Oct. 20, 2016.

European Search Report for EP Application No. 16165673.1; Date Mailed: Oct. 27, 2016.

Kostjuk, S.V., "Recent Progress in the Lewis Acid Co-Initiated Cationic Polymerization of Isobutylene and 1,3-dienes," *Royal Society of Chemistry*, 5(17): 13125-13144 (Jan. 2015).

Kumar, R., et al., "Synthesis of Highly Reactive Polyisobutylene With FeCl$_3$/Ether Complexes in Hexane; Kinetic and Mechanistic Studies," *Polymer Chemistry*, 6(2): 322-329 (Jan. 2015).

Bartelson, K.J., et al., "Cationic Polymerization of Isobutylene by FeCl$_3$/Ether Complexes in Hexanes: An Investigation of the Steric and Electronic Effects of Ethers," *Polymer*, 54(18): 4858-4863 (Jul. 2013).

\* cited by examiner

POLYMERIZATION INITIATING SYSTEM AND METHOD TO PRODUCE HIGHLY REACTIVE OLEFIN FUNCTIONAL POLYMERS

BACKGROUND OF THE INVENTION

The carbocationic polymerization of isobutylene (IB) is the subject of great scientific and industrial interest. The unique properties of polyisobutylene (PIB), a chemically stable fully saturated polymer make it a desirable material with applications ranging from medical devices to ashless (metal-free) dispersants/detergents suitable for use as motor oil and fuel additives. These ashless dispersants/detergents can be characterized as oil soluble surfactants with oligoamine end-groups derived from low molecular weight (number average molecular weight ($\overline{M}_n$) of from about 500 to about 5000) PIB or polybutenes (copolymers of IB with $C_4$ olefins) having olefinic end groups.

Two major industrial methods have been developed to produce low molecular weight IB homo or copolymers with olefinic end groups. The "conventional" method uses a $C_4$ mixture and an aluminum halide based catalyst system and produces polybutenes with high tri-substituted olefinic contents. Due to the low reactivity of the tri-substituted olefinic end groups, polybutenes need to be chlorinated to react with maleic anhydride to give polybutenylsuccinic anhydride, which is subsequently reacted with oligoalkylenimines to yield polybutenylsuccinimide-type ashless dispersant/detergent. The other method employs a pure IB feed stream and a $BF_3$ complex-based catalyst with either alcohols, or ethers in a polymerization reaction run at low temperature, which yields highly reactive PIB (HR PIB) with high exo-olefinic end-group contents. In contrast to the tri-substituted olefins of conventional polybutenes, PIB exo-olefins readily react with maleic anhydride in a thermal "ene" reaction to produce PIB succinic anhydride and subsequently polyisobutenylsuccinimide ashless dispersants. Because the final product does not contain chlorine, HR PIB is more desirable than conventional polybutenes. However, $BF_3$ is difficult to handle and the polymer may contain fluorine. Further, as noted above, this method requires a pure IB feed steam and low temperature (e.g., $-30°$ C.) and therefore results in a more expensive product.

The above-described commercial process for producing HR PIB has been reported by U.S. Pat. No. 5,408,018 (and DE-A 2702604) to Rath. A range of process enhancements were subsequently reported in. U.S. Pat. Nos. 6,407,186, 6,753,389, and 7,217,773 to Rath et al. and U.S. Pat. Nos. 6,846,903, 6,939,943 and 7,038,008 to Wettling et al. A modified process using a different temperature regime and a low residence time was also previously described (e.g., U.S. Pat. Nos. 6,562,913 and 6,683,138 to Baxter et al.). All of these disclosures describe polymerizations carried out with $BF_3$ catalyst and an alcohol or ether co-catalyst. Such catalytic processes can leave residual fluorine in the polymer especially when utilized with the commonly available mixed $C_4$ Raffinate I stream. The presence of even small amounts of fluorine cause problems in downstream functionalization reactors due to the release of HF and therefore require expensive fluorine removal post-treatment.

Many attempts have therefore been made to find other methods for producing HR PIB. For instance PIB with nearly quantitative exo-olefin end groups has been obtained by reacting tert-chloride-terminated PIB (PIB-Cl) with strong bases such as potassium tert-butoxide and alkali ethoxides in refluxing tetrahydrofuran (THF) for 20-24 h, (Kennedy, J. P.; Chang, V. S. C.; Smith, R. A.; Iván, B. Polym. Bull. 1979, 1, 575); quenching living PIB with methallyltrimethylsilane, (Nielsen, L. V.; Nielson, R. R.; Gao, B.; Kops, J.; Iván, B. Polymer 1997, 38, 2528.); quenching living PIB with a hindered base (e.g., 2,5-dimethylpyrrole or 1,2,2,6,6-pentamethylpiperidine), (Simison, K. L.; Stokes, C. D.; Harrison, J. J.; Storey, R. F. Macromolecules 2006, 39, 2481); quenching living PIB with an alkoxysilane or an ether compound (Storey, R. F.; Kemp, L. L. U.S. Patent Application Publication, 2009/0318624 A1, Dec. 24, 2009); and reacting living PIB with a mono-sulfide followed by decomposition of the resulting sulfonium salt with a base (Morgan. D. L.; Stokes, C. D.; Meierhoefer, M. A.; Storey, R. F. Macromolecules 2009, 42, 2344). However, all of the above methods are expensive as they involve living cationic polymerization at low temperature in a moderately polar solvent, and employ expensive reactants.

A broad disclosure of halogen-free metal catalysts based on oxides of Groups V and VI of the Periodic Table of Elements was described in U.S. Pat. No. 6,441,110 to Sigwart et al., but these catalysts were heterogeneous and gave poor monomer conversions, with only modest amounts of exo-olefins. Another catalyst system, based on metals from the $3^{rd}$ to the $12^{th}$ periods of the periodic system of elements with nitrile ligands and weakly coordinating anions was described in U.S. Pat. No. 7,291,758 to Bohnepoll et al. These catalysts were used only in a polar dichloromethane solution; not in an apolar, all-hydrocarbon media.

More recently it has been reported that $AlCl_3$—$OBu_2$ complexes in conjunction with a range of initiators or adventitious water initiate the polymerization of IB and in chlorinated polar solvent ($CH_2Cl_2$/hexane 80/20 v/v) yield PIB with high exo-olefinic end groups up to 95% in a range of temperatures ($-60$ to $-20°$ C.) (Vasilenko, I. V.; Frolov, A. N.; Kostjuk, S. V. Macromolecules 2010, 43(13), 5503-5507). Independently, similar results were reported with adventitious water as initiator in conjunction with $AlCl_3$ or $FeCl_3$ dialkyl ether complexes in $CH_2Cl_2$ at temperatures ranging from $-20$ to $20°$ C. (Lui, Q.; Wu Y.; Zhang, Y.; Yan. P. F.; Xu, R. W. Polymers 2010, 51, 5960-5969). $AlCl_3$—$OBu_2$ has been reported to produce PIB with terminal vinylidene bonds in the absence of solvent and without added initiator, or with water as an added initiator (USPG 2011/0201772A1 of König et al.). However, none of the conventional cationic initiators such as alkyl halides, ethers, esters, alcohols and Brønsted acids were found to initiate directly the polymerization in apolar media with $AlCl_3$. Therefore there remains a need for a robust and economic method for the preparation of highly reactive PIB or polybutene in a non-polar hydrocarbon media.

It was previously found that conventional cationic initiators used in conjunction with certain combinations of Lewis acid/Lewis base complexes initiate the polymerization of IB in hydrocarbon solvents at temperatures of $-30°$ C. to $+50°$ C. and provide high yields of highly reactive PIB. More specifically, it was recognized that polymerization of IB in hydrocarbon solvents at temperatures of $-30°$ C. to $+50°$ C. could be initiated, and provide high yields of highly reactive PIB with a catalyst-initiator system comprising a Lewis acid catalyst ($MR''Y_n$) complexed to a Lewis base (B) in an apolar medium.

The affinity of the Lewis acid for the Lewis base was such that the Lewis acid can interact at least partially with a conventional cationic initiator (RX), enabling the formation of $R^+$, which initiated cationic polymerization of isobutylene. The initially complexed Lewis base was capable of effecting rapid deprotonation of the growing carbocation chain to form an exo-olefin prior to isomerization of the cationic chain or diffusion of the base into free solution. If the Lewis base did not complex to the Lewis acid, at least initially, deprotonation of the growing carbocation was not sufficiently rapid relative to isomerization to give the desired high yields of exo-olefin. If the interaction of the Lewis acid and the Lewis base was so strong that it prevented interaction with a conventional initiator, polymerization was inefficient or did not occur at all. The Lewis acid or Lewis acid-Lewis base complex had to further be capable of interacting with a conventional initiator either in the presence or absence of adventitious water. Catalysts with which monomer conversion is substantially dependent on adventitious water, even in the presence conventional initiators, as evidenced by complete loss of conversion in the presence of a proton trap (e.g., 2,6-ditert-butylpyridine or "DTBP"), were not suitable. In the above systems, suitable Lewis bases were oxygen- and/or sulfur-containing nucleophiles, such as ethers, alcohols, ketones, aldehydes and esters, and sulfur-containing nucleophiles such as thioethers and thioketones.

Although the above polymerization system was found to provide excellent yields of highly reactive PIB in apolar hydrocarbon solvent, the Lewis acid-Lewis base complexes of the above polymerization system were themselves prepared in dichloromethane (DCM) solvent. However, the continued need for the use of chlorinated polar aliphatic solvents, such as $CH_2Cl_2$, is undesirable from a commercial (environmental) standpoint. Therefore, there remains a need for a robust and economical method for the preparation of highly reactive PIB or polybutene that, in no way requires the use of halogenated alkane solvent.

SUMMARY OF THE INVENTION

The invention is directed to a method for producing highly reactive olefin polymers wherein at least 50 mol. % of the polymer chains have terminal double bonds, and a novel polymerization initiating system for accomplishing same.

DETAILED DESCRIPTION OF THE INVENTION

A description of example embodiments of the invention follows.

Lewis acid catalysts useful in the practice of the present invention can be represented by the general formula $(MR''_m Y_n)$, wherein M is selected from Al, Fe, Ga, Hf, Zr and W; preferably Al, Ga or Fe, more preferably Al or Fe; R'' is a hydrocarbyl group, preferably a $C_1$ to $C_8$ hydrocarbyl group, more preferably a $C_1$ to $C_8$ alkyl group; m is 0 or an integer of 1 to 5, preferably 0 or 1, more preferably 0, with the proviso that, when M is Al, m is preferably 1, and R'' is preferably a $C_1$ to $C_3$ hydrocarbyl group, more preferably a methyl or ethyl group; Y is halogen (F, Cl, Br), preferably either Cl or Br, more preferably Cl, and n is an integer of 1 to 6, preferably 3 to 5; with the proviso that m+n is equal to the valency of M. As used herein, the term "hydrocarbyl" means a chemical group of a compound that contains hydrogen and carbon atoms and that is bonded to the remainder of the compound directly via a carbon atom. The group may contain one or more atoms other than carbon and hydrogen ("hetero atoms"), provided they do not affect the essentially hydrocarbyl nature of the group.

The Lewis base (B) is selected from oxygen- and/or sulfur-containing nucleophiles, such as ethers, alcohols, ketones, aldehydes and esters, and sulfur-containing nucleophiles such as thioethers and thioketones. Specific examples of suitable Lewis bases include acyclic dihydrocarbyl ethers, wherein each hydrocarbyl group is independently selected from $C_1$ to $C_{12}$ hydrocarbyl, cyclic ethers having a 5 to 7 membered cyclic group, dihydrocarbyl ketones, wherein each hydrocarbyl group is independently selected from $C_1$ to $C_{12}$ hydrocarbyl, $C_1$ to $C_{12}$ aliphatic alcohols, $C_1$ to $C_{12}$ aliphatic aldehydes, acyclic aliphatic esters wherein each hydrocarbyl group is independently selected from $C_1$ to $C_{12}$ hydrocarbyl, cyclic aliphatic esters having a 5 to 7 membered cyclic group, dihydrocarbyl sulfides, wherein each hydrocarbyl group is independently selected from $C_1$ to $C_{12}$ hydrocarbyl and dihydrocarbyl thiocarbonyl compounds, wherein each hydrocarbyl group is independently selected from $C_1$ to $C_{12}$ hydrocarbyl. The hydrocarbyl groups of the above Lewis bases are preferably alkyl groups and are more preferably $C_1$ to $C_4$ alkyl. The hydrocarbyl groups and cyclic aliphatic groups of the above Lewis bases may each independently be substituted with a heteroatom or a heteroatom-containing moiety and may further be substituted with other substituent groups that do not interfere significantly with the ability of such compounds to function as a Lewis base (e.g., $C_1$ to $C_4$ "lower alkyl" groups).

In one preferred embodiment, the Lewis base (B) is dihydrocarbyl ether or dihydrocarbyl ketone, wherein each hydrocarbyl group is independently selected from $C_1$ to $C_8$ hydrocarbyl. The hydrocarbyl groups of the above Lewis bases are preferably alkyl groups. The hydrocarbyl groups of the ether may be branched, straight chained or cyclic. Where the hydrocarbyl groups of the ether are branched or straight chained, the hydrocarbyl groups are preferably alkyl groups, more preferably $C_1$ to $C_4$ alkyl. One or each of the hydrocarbyl groups of the dihydrocarbyl ether or dihydrocarbyl ketone is substituted with an electron-withdrawing group, particularly a halogen atom, preferably chlorine.

An "initiator" is defined as a compound that can initiate polymerization, in the presence or absence of adventitious water and in the presence of a proton trap. The initiator of the present invention (RX) comprises a hydrocarbyl R group wherein the carbon linking group R to X is tertiary, benzylic or allylic, which hydrocarbyl group can form a stable carbocation (e.g., t-butyl$^+$), and an X group, which is a halogen.

The polymerization medium must be a substantially or completely apolar polymerization medium, such as a mixture of hexanes or saturated and unsaturated $C_4$ hydrocarbons.

In the polymerization process of the present invention, the feedstock may be pure isobutylene or a mixed $C_4$ hydrocarbyl feedstock containing isobutylene, such as a $C_4$ cut resulting from the thermal or catalytic cracking operation of, for example, naphtha. Thus, suitable feedstocks will typically contain at least 10%, and up to 100% isobutylene, by mass, based on the total mass of the feed. In addition to isobutylene, conventional $C_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-$C_4$ polymerizable olefin monomers in minor amounts, e.g., typically less than 25%, preferably less than about 10%, and most preferably less than 5%, such as propadiene, propylene and $C_5$ olefins. The $C_4$ cut may be purified by conventional means to remove water, polar impurities and dienes.

The term "polybutene", as employed herein is intended to include not only homopolymers of isobutylene, but also copolymers of isobutylene and one or more other $C_4$ polymerizable monomers of conventional $C_4$ cuts as well as non-$C_4$ ethylenically unsaturated olefin monomers containing 5 carbon atoms, provided such copolymers contain typically at least 50 mass %, preferably at least 65 mass %, and most preferably at least 80 mass % isobutylene units, based on the polymer number average molecular weight ($\overline{M}_n$).

The Lewis acid and Lewis base can be complexed by, for example, by dissolving the Lewis acid in a solvent selected from liquid, apolar, non-halogenated aliphatics, and liquid, aromatics, such as benzene, chlorobenzene, toluene and xylene, to form a solution and then adding the Lewis base to the solution, while the solution is stirred. The complex may be added to the polymerization medium with the solvent; alternatively, the solvent may be removed prior to the addition of the complex to the polymerization medium. Preferably, the solvent is a non-halogenated aromatic, and is more preferably xylene or toluene, most preferably toluene. When the Lewis acid and Lewis Base are complexed in xylene or toluene, it is preferable to dissolve the Lewis base in the xylene or toluene solvent to form a solution, and then add the Lewis acid to the Lewis base solution, while the solution is stirred. When the complex is to be formed in a liquid, apolar, non-halogenated aliphatic solvent, the Lewis acid must have at least one hydrocarbyl substituent ("m"≥1), to insure solubility.

The molar ratio of Lewis acid to Lewis base in the complex will typically be maintained within a range of from about 1:0.5 to about 1:2, preferably from about 1:0.7 to about 1:1.7, more preferably from about 1:1 to about 1:1.7, such as about 1:1 to about 1:1.5.

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of butene and yield of polybutene. In view of the above, the Lewis acid-Lewis base complex is typically employed in an amount sufficient to contact the butene monomer in a liquid phase reaction mixture at a concentration of millimoles of Lewis acid-Lewis base complex per liter of reaction mixture of from about 0.2 mM to about 200 mM, such as from about 1 mM to about 200 mM, preferably from about 5 mM to about 100 mM, and more preferably from about 10 mM to about 50 mM, such as about 10 mM to about 30 mM.

The initiator will typically be employed in an amount sufficient to contact the butene monomer in a liquid phase reaction mixture at a concentration of millimoles of initiator per liter of medium, and independent from the amount of Lewis acid-Lewis base complex, of from about 1 mM to about 200 mM, preferably from about 5 mM to about 100 mM, and more preferably from about 10 mM to about 50 mM, such as about 10 mM to about 30 mM.

The polymerization reaction can be conducted batchwise, semi-continuously, or continuously. On an industrial scale, the polymerization reaction is preferably conducted continuously. Conventional reactors, such as tubular reactors, tube-bundle reactors or loop reactors, or tube or tube-bundle reactors with continuous circulation of the reaction material, may be used.

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_6$ alkanes, such as propane, butane, pentane and isobutane.

The Lewis acid-Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator may be introduced to the monomer feed or the reaction mixture in liquid form together with the Lewis acid-Lewis base complex or, preferably, is introduced to the monomer feed or the reaction mixture in liquid form by a line separate from the Lewis acid-Lewis base complex addition line.

The liquid phase reaction mixture temperature is controlled by conventional means to be typically from about −30° C. to about +50° C., preferably from about −10° C. to about +30° C., more preferably from about 0° C. to about +20° C., such as about 0° C. to about +10° C.

The residence time of the butene to be polymerized may be from about 5 seconds to several hours, but will typically be from about 1 to about 300 minutes, such as 2 to about 120 minutes, preferably from about 5 to about 60 minutes.

In order to insure even distribution of the catalyst within the reactor, turbulent flow of the reactor contents can be generated by mixing, or with suitable baffles, such as baffle plates or oscillating baffles, or by dimensioning the reactor tube cross sections so that a suitable flow velocity is established.

The process of the present invention is typically conducted in a manner achieving an isobutylene conversion in the range of from about 20% up to about 100%, preferably from about 50% to about 100%, and more preferably from about 70% to about 100%, such as 80% to 100%, 90% to 100% or 95% to 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol. %, more preferably greater than 70 mol. %, such as from about 80 mol. % to about 95 mol. %; a tetrasubstituted olefin content of less than about 20 mol. %, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol. %, based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

In one commercially preferred embodiment (from a standpoint of performance, environmental impact and cost), the Lewis acid is R'AlCl$_2$, wherein R' is C$_1$ to C$_4$ hydrocarbyl, specifically, MeAlCl$_2$, EtAlCl$_2$, iso-BuAlCl$_2$ or n-BuAlCl$_2$, the Lewis base is a chlorinated dihydrocarbyl ether or a chlorinated dihydrocarbyl ketone, the solvent is toluene, and the complex is formed by dissolving the Lewis base in the solvent to form a solution and then adding the Lewis acid to the Lewis base solution in an amount such that the molar ratio of Lewis acid to Lewis base in the complex is from about 1:1 to about 1:1.5.

This invention will be further understood by reference to the following examples, which are not intended, and should not be construed as listing all possible embodiments within the scope of the invention.

Examples

Polymerization

Polymerizations were carried out under a dry nitrogen atmosphere in an MBraun 150-M glove box (Innovative Technology Inc., Newburyport, Mass.). Isobutene (IB) was condensed and distributed to the polymerization reactors, screw top culture tubes (75 ml) at −30° C. Polymerizations were conducted in hexanes co-initiated with the appropriate Lewis acid with a monomer concentration of 1 M, at 0° C. After a predetermined time, polymerization was terminated by addition of 0.2 mL methanol. The polymer was recovered and purified by re-precipitation from NH$_4$OH solution. Conversions were determined by gravimetric analysis.

Preparation of Lewis Acid/Lewis Base (LA/LB) Complexes

FeCl$_3$.i-Pr$_2$O complexes were prepared at room temperature just before the polymerization of IB. In the glovebox, dry solvent was added to FeCl$_3$ powder, which was only partially soluble. A calculated amount of i-Pr$_2$O was then added drop-wise via a syringe, while stirring, to form a 1.0 M FeCl$_3$.i-Pr$_2$O complex solution.

Characterization

Number average molecular weight ($\overline{M}_n$) and polydispersities (PDI) of the polymers were obtained from size exclusion chromatography with universal calibration using a Waters 717 Plus autosampler, a 515 HPLC pump, a 2410 differential refractometer, a 2487 UV-VIS detector, a MiniDawn multi angle laser light scattering (MALLS) detector (measurement angles of 44.7°, 90.0°, and 135.4°) from Wyatt Technology Inc, ViscoStar viscosity detector from Wyatt Technology Inc., and five Ultrastyragel GPC columns connected in the following order: 500, 10$^3$, 10$^4$, 10$^5$ and 100 Å. Refractive index (RI) was the concentration detector. Tetrahydrofuran was used as the eluent at a flow rate of 1.0 ml/min at room temperature. The results were processed by Astra 5.4 software from Wyatt Technology Inc.

Nuclear Magnetic Resonance

Proton nuclear magnetic resonance ($^1$H NMR) spectra were recorded on a Bruker 500 MHz spectrometer using CDCl$^3$ as solvent (Cambridge Isotope Laboratory, Inc.). The polyisobutene (PIB) end group content was determined by $^1$H NMR as previously reported (see Kumar, R.; Dimitrov, P.; Bartelson, K. J.; Faust, R., *Macromolecules* 2012, 45, 8598-8603).

Fourier Transformed Infrared Spectroscopy (FTIR)

FTIR studies were performed in situ using a Mettler Toledo ReactIR 4000 instrument with DiComp probe coupled to a MCT detector with a K6 conduit. Spectra between 650 and 4000 cm$^{-1}$ were obtained at resolution of 8 cm$^{-1}$ wavenumbers.

Results

While not wishing to be bound by any specific theory, it is suggested that one possible polymerization scheme for the polymerization of IB with FeCl$_3$ is as shown below:

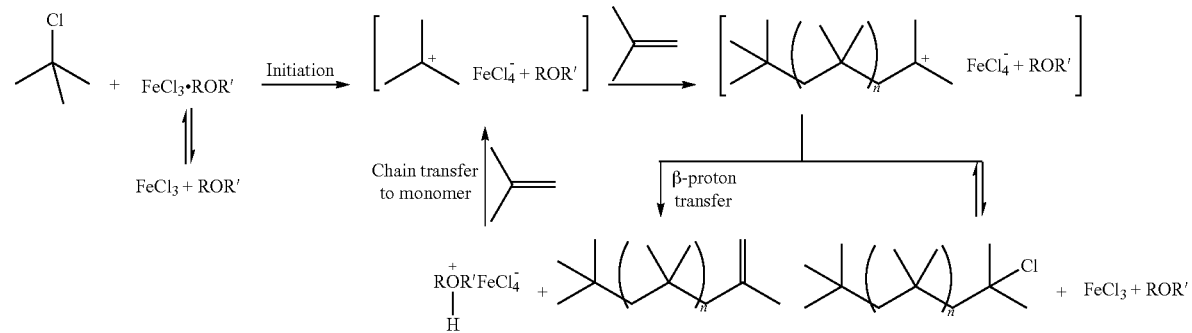

The above cationic polymerization requires a solvent that does not react with the Lewis acid or the cation. Therefore, such cationic polymerizations employ hydrocarbons or chlorinated hydrocarbons as solvents (although nitro compounds have also been used). The polymerization of IB was investigated with FeCl$_3$.i-Pr$_2$O complexes prepared in different solvents. The results are shown in Table 1.

TABLE 1

Polymerization of IB in hexanes at 0° C. for 30 minutes initiated by t-BuCl and coinitiated by FeCl$_3$•i-Pr$_2$O. (IB) = 1.0M, (t-BuCl) = 0.02M and (FeCl$_3$•i-Pr$_2$O) = 0.02M. Quenched with MeOH

| Entry # | Solvent for Complex Preparation | Conv.[a] (%) | $\overline{M}_n$ NMR g/mol | $\overline{M}_n$ GPC g/mol | PDI | Exo[b] (%) | Endo + Tri[b] (%) | Tetra[b] (%) | PIB-Cl[b] (%) | Coupled[b] (%) |
|---|---|---|---|---|---|---|---|---|---|---|
| 1 | DCM | 58 | 900 | 1000 | 3.5 | 72 | 14 | 14 | 0 | 0 |
| 2 | Benzene | 58 | 700 | 800 | 3.0 | 79 | 11 | 10 | 0 | 0 |

TABLE 1-continued

Polymerization of IB in hexanes at 0° C. for 30 minutes initiated by t-BuCl and coinitiated by FeCl$_3$•i-Pr$_2$O. (IB) = 1.0M, (t-BuCl) = 0.02M and (FeCl$_3$•i-Pr$_2$O) = 0.02M. Quenched with MeOH

| Entry # | Solvent for Complex Preparation | Conv.[a] (%) | $\overline{M}_n$ NMR g/mol | $\overline{M}_n$ GPC g/mol | PDI | Exo[b] (%) | Endo + Tri[b] (%) | Tetra[b] (%) | PIB-Cl[b] (%) | Coupled[b] (%) |
|---|---|---|---|---|---|---|---|---|---|---|
| 3 | Chlorobenzene | 61 | 800 | 900 | 3.3 | 74 | 14 | 11 | 0 | 0 |
| 4 | Toluene | 42 | 900 | 800 | 3.1 | 75 | 13 | 12 | 0 | 0 |
| 5 | o-Xylene | 23 | 500 | — | — | 84 | 10 | 0 | 0 | 6 |
| 6 | Nitrobenzene | 0 | — | — | — | — | — | — | — | — |
| 7 | Acetonitrile | 0 | — | — | — | — | — | — | — | — |
| 8 | Hexanes | 0 | — | — | — | — | — | — | — | — |

[a]Gravimetric conversion.
[b]Determined by $^1$H NMR spectroscopy.

As shown, when the complex was prepared in DCM, 58% conversion was obtained after 30 minutes. Similar conversions were also obtained when the complex was prepared in benzene and chlorobenzene. Conversion decreased, however, to 42% when the complex was prepared in toluene and to 23% when the complex was prepared in o-xylene. Polymerization did not occur when the complex was prepared in nitrobenzene, acetonitrile or hexanes. To understand these differences, the solubility of the complex was measured in the different solvents.

Solubility studies were conducted using FeCl$_3$.i-Pr$_2$O complexes prepared in different solvents using a simple centrifuge experiment simulating polymerization conditions. FeCl$_3$.i-Pr$_2$O complexes were prepared as a 1.0 M solution in various solvents in a 30 mL centrifuge tube. The centrifuge tube was allowed to equilibrate to the appropriate temperature in the centrifuge before it was spun at 3750 rpm for 10 minutes. The mass of soluble complex was measured by gravimetric analysis by taking an aliquot of the clear solution. The solubility of the complex in the tested solvents is shown in Table 2.

TABLE 2

Solubility data for 1M FeCl$_3$•i-Pr$_2$O complexes (prepared in different solvents) at room temperature.

| Entry # | Solvent | % Solubility |
|---|---|---|
| 9 | DCM | 59 |
| 10 | toluene | 66 |
| 11 | benzene | 67 |
| 12 | chlorobenzene | 67 |
| 13 | hexanes | 0 |
| 14 | nitrobenzene | 100 |
| 15 | acetonitrile | 100 |

As shown in Table 2, approximately 60 to 70% of the complex was soluble in DCM, benzene, toluene and chlorobenzene. In nitrobenzene and acetonitrile the complex was completely soluble, while in hexanes, the complex was insoluble. The above demonstrates that the solubility of the complex in the solvent is not the only factor determining conversion. Polymerization was absent when the complex was prepared in hexanes, in which the complex was insoluble. However, polymerization was also absent when the complex was made in acetonitrile and nitrobenzene, in which the complex was completely soluble. The solubility of the FeCl$_3$.i-Pr$_2$O complex in toluene is similar to the solubility in benzene, chlorobenzene and DCM, yet the conversion was lower.

To better understand the effects of solvent selection on polymerization complex formation between FeCl$_3$ and i-Pr$_2$O was studied in different solvents at room temperature using ATR FTIR spectroscopy. It was previously reported that FeCl$_3$ and i-Pr$_2$O form a 1:1 complex in DCM (Lui, Q.; Wu Y. X.; Yan, P. F.; Zhang, Y.; Xu, R. W. *Macromolecules* 2011, 44, 1866-1875). Upon mixing equivalent amounts of FeCl$_3$ and i-Pr$_2$O in toluene, the disappearance of a peak at 1010 cm$^{-1}$ indicated the formation of a 1:1 molar complex. Similarly, the characteristic peak for C—O—C stretch from i-Pr$_2$O at 1010 cm$^{-1}$ was absent when the complex was prepared in benzene. With xylene, however, the complex formation between FeCl$_3$ and i-Pr$_2$O was different (compared to complexes formed in benzene and toluene), suggesting that there is some interaction between xylene and FeCl$_3$.

ATR FTIR spectra were also run to study the interaction between FeCl$_3$ and nitrobenzene. A sharp peak at 1300 cm$^{-1}$ could be due to N—O stretching, which changes upon interaction with FeCl$_3$. However, when FeCl$_3$.i-Pr$_2$O complex spectra was taken using nitrobenzene as solvent, the presence of a C—O stretching peak was observed at 1010 cm$^{-1}$ which indicates the presence of uncomplexed i-Pr$_2$O in nitrobenzene. It was previously reported that FeCl$_3$ and nitromethane forms a 1:1 complex (Olah, G. A., Kuhn, S. J., Flood, S. H., Hardie, B. A., Aromatic substitution XIV, Ferric chloride catalyzed bromination of benzene and alkylbenzenes with bromide in nitromethane solution, *J. Am. Chem. Soc.*, 86:1039-1044 (1964)). A similar complexation between FeCl$_3$ and nitrobenzene or acetonitrile may explain the lack of polymerization.

The difference in conversions obtained with toluene and xylene relative to those obtained with benzene and chlorobenzene may be due to a side reaction involving the chlorination of the aromatic ring by FeCl$_3$. It was previously reported that anhydrous FeCl$_3$ could be used as an aromatic chlorination agent (Kovacic P, Wu, C., Stewart R. W. Reaction of Ferric Chloride with Alkylbenzenes, *J. Am. Chem. Soc.*, 82, 1917-1923 (1960)). The mechanism proposed by Kovacic et al. is as follows:

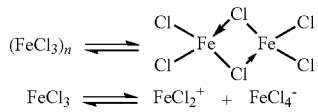

reflux temperature. Based on these results, one can conclude that the low conversion with o-xylene is due to the consumption of $FeCl_3$ in the chlorination reaction, resulting in excess free ether. Excess free ether was previously found to hinder polymerization (Kumar, R. Dimitrov, P. Bartelson, K. J., Emert, J., Faust, R., Polymerization of Isobutylene by $GaCl_3$ or $FeCl_3$/Ether Complexes in Non Polar Solvents, *Macromolecules,* 45, 8598-8603 (2012)). This side reaction was slower with toluene and inconsequential with benzene and chlorobenzene as the use of these solvents resulted in conversions similar to that obtained when the complex was prepared in DCM.

To avoid the above side reaction, the method for forming the complex was modified by adding an equivalent amount of $FeCl_3$ to $i-Pr_2O$ dissolved in toluene. Using this method, the $FeCl_3$ rapidly forms a complex with $i-Pr_2O$, decreasing the Lewis acidity and reducing the level of side reaction with the toluene. Using this modified method, a $FeCl_3 \cdot i-Pr_2O$ complex was formed, which complex was then used in a polymerization of IB that resulted in a 63% conversion; a conversion rate similar to that observed with DCM, benzene and chlorobenzene (see Table 3).

TABLE 3

Polymerization of IB in hexanes at 0° C. for 30 minutes initiated by t-BuCl and coinitiated by $FeCl_3 \cdot i-Pr_2O$ complex . (IB) = 1.0M, (t-BuCl) = 0.02M and ($FeCl_3 \cdot t-Pr_2O$) = 0.02M. Quenched with MeOH
Method 1: $FeCl_3$ added to mixture of solvent (toluene) and $i-Pr_2O$.
Method 2: $FeCl_3$ + Toluene + $i-Pr_2O$.

| Entry # | Method | Conv.[c] (%) | $\overline{M}_n$ NMR g/mol | $\overline{M}_n$ GPC g/mol | PDI | Exo[d] (%) | Endo + Tri[d] (%) | Tetra[d] (%) | PIB-Cl[d] (%) | Coupled[d] (%) |
|---|---|---|---|---|---|---|---|---|---|---|
| 16 | 1 | 63 | 900 | 900 | 3.5 | 68 | 13 | 14 | 4 | 0 |
| 17 | 2 | 42 | 900 | 800 | 3.1 | 75 | 13 | 12 | 0 | 0 |

[c]Gravimetric conversion.
[d]Determined by $^1H$ NMR spectroscopy.

A polymerization reaction was performed using a $EtAlCl_2 \cdot$bis-(2-chloroethyl)ether complex prepared in toluene, wherein the complex was prepared by adding the bis-(2-chloroethyl)ether to the toluene to form a solution, and then adding the $EtAlCl_2$ to the bis-(2-chloroethyl)ether solution in an amount such that the molar excess of bis-(2-chloroethyl)ether in the complex (a molar ratio of $EtAlCl_2$ to the bis-(2-chloroethyl)ether of 1:1.5). Conversion data is shown in Table 4.

TABLE 4

Polymerization of IB in hexanes at 0° C. for 20 minutes initiated by t-BuCl and coinitiated by $EtAlCl_2 \cdot$bis-(2-chloroethyl)ether complex (LA/LB = 1:1.5). (IB) = 1.0M, (t-BuCl) = 0.02M and ($EtAlCl_2 \cdot$bis-(2-chloroethyl)ether) = 0.02M. Quenched with MeOH

| Entry# | Conv.[c] (%) | $\overline{M}_n$ NMR g/mol | $\overline{M}_n$ GPC g/mol | PDI | Exo[d] (%) | Endo + Tri[d] (%) | Tetra[d] (%) | PIB-Cl[d] (%) | Coupled[d] (%) |
|---|---|---|---|---|---|---|---|---|---|
| 18 | 100 | 900 | 1000 | 2.9 | 85 | 7 | 4 | 3 | 1 |

[c]Gravimetric conversion.
[d]Determined by $^1H$ NMR spectroscopy.

While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A process for the preparation of polybutene having an exo-olefin content of at least 50 mol %, which process comprises complexing a Lewis acid catalyst with an oxygen and/or sulfur-containing Lewis base in a solvent selected from liquid, apolar, non-halogenated aliphatic solvents, or and liquid aromatic solvents, contacting isobutene or an isobutene-containing monomer mixture, with the resulting Lewis acid/Lewis base complex, in a substantially or completely apolar polymerization medium, and initiating polymerization of said isobutene or an isobutene-containing monomer mixture with an initiator, wherein said Lewis acid catalyst is a Lewis acid of the formula $MR''_mY_n$, wherein M is a metal selected from Al, Fe, Ga, Hf, Zr or W; R'' is a hydrocarbyl group; Y is halogen; m is 0 or an integer of 1 to 5, n is an integer of 1 to 6 and m+n is equal to the valency of metal M, with the proviso that, when M is Al, m is 1 and when said solvent is a liquid, apolar, non-halogenated aliphatic solvent, m is at least 1; and the initiator is a compound of the formula RX, wherein X is a halide; R is a hydrocarbyl group that forms a stable carbocation, and wherein the carbon linking group R to group X is tertiary, benzylic or allylic.

2. The process of claim 1, wherein M is Al, Ga or Fe, and R'' is a $C_1$ to $C_8$ alkyl group.

3. The process of claim 1, wherein M is Al or Fe.

4. The process of claim 1, wherein Y is Cl or Br.

5. The process of claim 1, wherein said Lewis base is selected from acyclic dihydrocarbyl ethers, wherein each hydrocarbyl group is independently selected from $C_1$ to $C_{12}$ hydrocarbyl, cyclic ethers having a 5 to 7 membered cyclic group, dihydrocarbyl ketones, wherein each hydrocarbyl group is independently selected from $C_1$ to $C_{12}$ hydrocarbyl, $C_1$ to $C_{12}$ aliphatic alcohols, $C_1$ to $C_{12}$ aliphatic aldehydes, acyclic aliphatic hydrocarbyl esters wherein the hydrocarbyl group is selected from $C_1$ to $C_{12}$ hydrocarbyl, cyclic aliphatic esters having a 5 to 7 membered cyclic group, dialkyl sulfides, wherein each alkyl group is independently selected from $C_1$ to $C_{12}$ alkyl, dihydrocarbyl thiocarbonyl compounds, wherein each hydrocarbyl group is independently selected from $C_1$ to $C_{12}$ hydrocarbyl, or mixtures thereof.

6. The process of claim 5, wherein said Lewis base is selected from acyclic dialkyl ethers, wherein each alkyl group is independently selected from $C_1$ to $C_4$ alkyl, cyclic ethers having a 5 to 7 membered cyclic group, dialkyl ketones, wherein each alkyl group is independently selected from $C_1$ to $C_4$ alkyl, $C_1$ to $C_4$ aliphatic alcohols, $C_1$ to $C_4$ aliphatic aldehydes, acyclic aliphatic hydrocarbyl esters wherein the hydrocarbyl group is selected from $C_1$ to $C_4$ alkyl, cyclic aliphatic esters having a 5 to 7 membered cyclic group, dialkyl sulfides, wherein each alkyl group is independently selected from $C_1$ to $C_4$ alkyl, dialkyl thiocarbonyl compounds, wherein each alkyl group is independently selected from $C_1$ to $C_4$ alkyl, or mixtures thereof.

7. The process of claim 5, wherein said Lewis base is a dihydrocarbyl ether or dihydrocarbyl ketone, wherein each hydrocarbyl group is independently selected from $C_1$ to $C_8$ hydrocarbyl, wherein one or each of said hydrocarbyl groups of said dihydrocarbyl ether or dihydrocarbyl ketone is substituted with an electron-withdrawing group.

8. The process of claim 7, wherein said electron-withdrawing group is a halogen atom.

9. The process of claim 8, wherein said halogen atom is chlorine.

10. The process of claim 5, wherein said hydrocarbyl groups of said Lewis bases are branched or straight-chained $C_1$ to $C_4$ alkyl groups.

11. The process of claim 7, wherein said hydrocarbyl groups of said Lewis bases are branched or straight-chained $C_1$ to $C_4$ alkyl groups.

12. The process of claim 1, wherein said solvent is a liquid, apolar, non-halogenated aliphatic solvent, and m>1.

13. The process of claim 1, wherein said solvent is a liquid, aromatic solvent selected from benzene, chlorobenzene, toluene or xylene.

14. The process of claim 13, wherein said solvent is toluene or xylene.

15. The process of claim 1, wherein said apolar polymerization medium is selected from saturated $C_4$ hydrocarbons, unsaturated $C_4$ hydrocarbons, or mixtures thereof.

16. The process of claim 1, wherein said isobutene or an isobutene-containing monomer mixture is selected from pure isobutene; a $C_4$ refinery cut containing between about 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the $C_4$ refinery cut; or mixtures of pure isobutene and said $C_4$ refinery cut.

17. The process of claim 1, wherein said complex is contacted with said isobutene or an isobutene-containing monomer at a concentration of millimoles of Lewis acid-Lewis base complex per liter of medium of from about 0.2 mM to about 200 mM.

18. The process of claim 1, wherein said Lewis acid and said Lewis base are complexed by dissolving the Lewis acid in said solvent to form a solution, and then adding said Lewis base to said solution.

19. The process of claim 14, wherein said solvent is selected from xylene or toluene, and said Lewis Acid and said Lewis base are complexed by dissolving the Lewis base in said solvent to form a solution, and then adding said Lewis acid to said solution.

20. The process of claim 1, wherein the polymerization process is conducted continuously.

21. The process of claim 1, wherein said polybutene product has an exo-olefin content of at least 70 mol %.

22. The process of claim 1, wherein said Lewis acid is selected from MeAlCl$_2$, EtAlCl$_2$, iso-BuAlCl$_2$ or n-BuAlCl$_2$; said Lewis base is a dihydrocarbyl ether, wherein each hydrocarbyl group is independently selected from C$_1$ to C$_8$ hydrocarbyl, and wherein one or each of said hydrocarbyl groups of said dihydrocarbyl ether is substituted with chlorine; said solvent is selected from benzene or toluene and said Lewis acid and said Lewis base is complexed by dissolving the Lewis base in said solvent to form a solution, and then adding said Lewis acid to said solution in an amount such that the molar ratio of Lewis acid to Lewis base in the complex is from about 1:1 to about 1:1.7.

23. The process of claim 1, wherein said Lewis acid is selected from MeAlCl$_2$, EtAlCl$_2$, iso-BuAlCl$_2$ or n-BuAlCl$_2$, and said solvent is selected from benzene and toluene and said Lewis acid and said Lewis base are complexed by dissolving the Lewis base in said solvent to form a solution, and then adding said Lewis acid to said solution in an amount such that the molar ratio of Lewis acid to Lewis base in the complex is from about 1:1 to about 1:1.7.

24. A catalyst-initiator system for catalyzing the polymerization of isobutene or an isobutene-containing monomer mixture in a substantially or completely apolar polymerization medium to provide a polybutene product having an exo-olefin content of at least 50 mol %, wherein said catalyst consists essentially of a Lewis acid catalyst complexed with an oxygen and/or sulfur containing Lewis base in a solvent selected from liquid, apolar, non-halogenated aliphatic solvents, or liquid aromatic solvents, wherein said Lewis base is a dihydrocarbyl ketone, wherein each hydrocarbyl group of said dihydrocarbyl ketone is independently selected from C$_1$ to C$_8$ hydrocarbyl, and wherein one or each of said hydrocarbyl groups of said dihydrocarbyl ketone is substituted with chlorine, and said Lewis acid catalyst is a Lewis acid of the formula MR"$_m$Y$_n$, wherein M is a metal selected from Al, Fe, Ga, Hf, Zr or W; R" is a hydrocarbyl group; Y is halogen; m is 0 or an integer of 1 to 5, n is an integer of 1 to 6, and m+n is equal to the valency of metal M with the proviso that, when M is Al, m is 1 and when said solvent is a liquid, apolar, non-halogenated aliphatic solvent, m is at least 1; and wherein said initiator is a compound of the formula RX, wherein X is a halide; R is a hydrocarbyl group that forms a stable carbocation, and wherein the carbon linking group R to group X is tertiary, benzylic or allylic.

25. The catalyst-initiator system of claim 24, wherein M is Al, Ga or Fe, and R" is a C$_1$ to C$_8$ alkyl group.

26. The catalyst-initiator system of claim 25, wherein M is Al or Fe.

27. The catalyst-initiator system of claim 24, wherein Y is Cl or Br.

28. The catalyst-initiator system of claim 24, wherein said solvent is a liquid, apolar, non-halogenated aliphatic solvent, and m>1.

29. The catalyst-initiator system of claim 24, wherein said solvent is a liquid, aromatic solvent selected from benzene, chlorobenzene, toluene or xylene.

30. The catalyst-initiator system of claim 29, wherein said solvent is toluene or xylene.

31. The catalyst-initiator system of claim 24, wherein said Lewis acid and said Lewis base are complexed by dissolving the Lewis acid in solvent to form a solution, and then adding said Lewis base to said solution.

32. The catalyst-initiator system of claim 24, wherein said solvent is selected from benzene or toluene and said Lewis acid and said Lewis base are complexed by dissolving the Lewis base in said solvent to form a solution, and then adding said Lewis acid to said solution.

33. The catalyst-initiator system of claim 24, wherein said Lewis acid is selected from MeAlCl$_2$, EtAlCl$_2$, iso-BuAlCl$_2$ or n-BuAlCl$_2$; and said solvent is selected from benzene or toluene and said Lewis acid and said Lewis base are complexed by dissolving said Lewis base in said solvent to form a solution, and then adding said Lewis acid to said solution in an amount such that the molar ratio of Lewis acid to Lewis base in said complex is from about 1:1 to about 1:1.7.

34. A catalyst-initiator system for catalyzing the polymerization of isobutene or an isobutene-containing monomer mixture in a substantially or completely apolar polymerization medium to provide a polybutene product having an exo-olefin content of at least 50 mol %, wherein said catalyst consists essentially of a Lewis acid catalyst complexed with an oxygen and/or sulfur containing Lewis base in a solvent selected from benzene and toluene, wherein said Lewis acid catalyst is a Lewis acid selected from MeAlCl$_2$, EtAlCl$_2$, iso-BuAlCl$_2$ or n-BuAlCl$_2$, and wherein said Lewis base is a dihydrocarbyl ketone, wherein each hydrocarbyl group is independently selected from C$_1$ to C$_8$ hydrocarbyl, and wherein one or each of said hydrocarbyl groups of said dihydrocarbyl ketone is substituted with chlorine, and said Lewis acid and said Lewis base are complexed by dissolving said Lewis base in said solvent to form a solution, and then adding said Lewis acid to said solution in an amount such that the molar ratio of Lewis acid to Lewis base in said complex is from about 1:1 to about 1:1.7.

* * * * *